(12) United States Patent
Wang

(10) Patent No.: US 10,055,273 B2
(45) Date of Patent: Aug. 21, 2018

(54) METHOD FOR CHECKING WHETHER HARDWARE OF INTELLIGENT TERMINAL RUNS ABNORMALLY AND INTELLIGENT TERMINAL

(71) Applicant: Huawei Device (Dongguan) Co., Ltd., Dongguan (CN)

(72) Inventor: Kui Wang, Shenzhen (CN)

(73) Assignee: Huawei Device (Dongguan) Co., Ltd., Dongguan (CN)

(*) Notice: Subject to any disclaimer, the term of this patent is extended or adjusted under 35 U.S.C. 154(b) by 114 days.

(21) Appl. No.: 15/107,811

(22) PCT Filed: Dec. 24, 2013

(86) PCT No.: PCT/CN2013/090333
§ 371 (c)(1),
(2) Date: Jun. 23, 2016

(87) PCT Pub. No.: WO2015/096033
PCT Pub. Date: Jul. 2, 2015

(65) Prior Publication Data
US 2016/0342452 A1 Nov. 24, 2016

(51) Int. Cl.
*G06F 11/00* (2006.01)
*G06F 11/07* (2006.01)
*G06F 11/22* (2006.01)

(52) U.S. Cl.
CPC ............ *G06F 11/079* (2013.01); *G06F 11/00* (2013.01); *G06F 11/0706* (2013.01);
(Continued)

(58) Field of Classification Search
CPC .............. G06F 11/079; G06F 11/0754; G06F 11/0772; G06F 11/0742; G06F 11/0706; G06F 11/2205
See application file for complete search history.

(56) References Cited

U.S. PATENT DOCUMENTS

2006/0010352 A1  1/2006  Mukherjee et al.
2007/0038885 A1  2/2007  Hartung
(Continued)

FOREIGN PATENT DOCUMENTS

CN       1756406 A      4/2006
CN       101170455 A    4/2008
(Continued)

*Primary Examiner* — Michael Maskulinski

(57) ABSTRACT

Embodiments of the present invention provide a method for checking whether hardware of an intelligent terminal runs abnormally. The method includes: checking, by an intelligent terminal at a service layer, whether load of an intelligent terminal system exceeds a preconfigured maximum threshold; if the intelligent terminal detects that the load of the intelligent terminal system does not exceed the maximum threshold, triggering, by the intelligent terminal at the service layer, execution of determining whether hardware runs abnormally; determining, by the intelligent terminal, whether the hardware runs abnormally; determining, by the intelligent terminal, target hardware that runs abnormally; and acquiring, by the intelligent terminal, exception information of the target hardware, and notifying a user that the target hardware runs abnormally. This avoids increasing load of the intelligent terminal system and thereby ensures that the intelligent terminal runs normally.

10 Claims, 9 Drawing Sheets

(52) U.S. Cl.
CPC ...... *G06F 11/0754* (2013.01); *G06F 11/0772* (2013.01); *G06F 11/2205* (2013.01)

(56) References Cited

U.S. PATENT DOCUMENTS

| | | |
|---|---|---|
| 2009/0164849 A1 | 6/2009 | Sugaya |
| 2010/0171608 A1 | 7/2010 | Harkins et al. |
| 2012/0005535 A1 | 1/2012 | Shigehara |
| 2016/0328282 A1* | 11/2016 | Rogati ................ G06F 11/0772 |
| 2018/0063703 A1* | 3/2018 | Hurst ..................... H04W 8/24 |

FOREIGN PATENT DOCUMENTS

| | | |
|---|---|---|
| CN | 201733408 U | 2/2011 |
| CN | 102045445 A | 5/2011 |
| CN | 103019913 A | 4/2013 |
| CN | 103037108 A | 4/2013 |
| CN | 103136085 A | 6/2013 |
| CN | 103458086 A | 12/2013 |
| JP | H0612276 A | 1/1994 |
| JP | H1003397 A | 6/1996 |
| JP | H08166892 A | 6/1996 |
| JP | 2007520003 A | 7/2007 |
| JP | 2009157457 A | 7/2009 |
| JP | 2010122790 A | 6/2010 |
| JP | 2010218277 A | 9/2010 |
| JP | 2011248658 A | 12/2011 |
| WO | 2006/064353 A2 | 6/2006 |

\* cited by examiner

METHOD FOR CHECKING WHETHER HARDWARE OF INTELLIGENT TERMINAL RUNS ABNORMALLY AND INTELLIGENT TERMINAL

CROSS REFERENCE TO RELATED APPLICATIONS

The present application claims priority under 35 U.S.C. § 365 to International Patent Application No. PCT/CN2013/090333 filed Dec. 24, 2013 which is incorporated herein by reference into the present disclosure as if fully set forth herein.

TECHNICAL FIELD

The present invention belongs to the field of mobile communications technologies, and in particular, relates to a method for checking whether hardware of an intelligent terminal runs abnormally and an intelligent terminal.

BACKGROUND

At present, intelligent terminals become increasingly popular. There are a large amount of hardware on an intelligent terminal, such as a light sensing module, a positioning and navigation module, a barometer, an acceleration sensor, a temperature sensor, and a gyroscope. The hardware is usually used in combination with an application program. In practice, only when an intelligent terminal detects that a user uses an application program that needs to invoke hardware, and the application program receives no response, can the intelligent terminal identify that a fault may occur in the hardware and consequently the application program that invokes the hardware cannot be used normally. This type of hardware fault identification is passive, and the intelligent terminal cannot actively identify whether the hardware runs abnormally.

In the prior art, to enable an intelligent terminal to actively identify whether hardware runs abnormally, an application program for checking hardware performance needs to be run at an application layer of the intelligent terminal. The intelligent terminal can acquire, by invoking the application program, current performance and a working status of hardware according to a value transferred by a device driver, so as to determine whether the hardware runs normally.

To some extent, the method can identify a hardware error. However, the application program for checking hardware performance needs to be pre-installed at the application layer of the intelligent terminal. If the application program is not pre-installed or is not invoked after installation, the intelligent terminal cannot actively identify a hardware exception.

SUMMARY

Embodiments of the present invention provide a method for checking whether hardware of an intelligent terminal runs abnormally and an intelligent terminal, so that the intelligent terminal can actively notify a user when an exception occurs in terminal hardware.

A first aspect of the embodiments of the present invention provides a method for checking whether hardware of an intelligent terminal runs abnormally, where the method includes:

checking, by an intelligent terminal at a service layer, whether load of an intelligent terminal system exceeds a preconfigured maximum threshold;

if the intelligent terminal detects that the load of the intelligent terminal system does not exceed the maximum threshold, triggering, by the intelligent terminal at the service layer, execution of determining whether hardware runs abnormally;

determining, by the intelligent terminal, whether the hardware runs abnormally;

determining, by the intelligent terminal, target hardware that runs abnormally; and acquiring, by the intelligent terminal, exception information of the target hardware, and notifying a user that the target hardware runs abnormally.

With reference to the first aspect of the embodiments of the present invention, in a first implementation manner of the first aspect of the embodiments of the present invention, the determining, by the intelligent terminal, whether the hardware runs abnormally further includes:

acquiring, by the intelligent terminal, a use frequency of the hardware;

creating, by the intelligent terminal, a check list according to the use frequency of the hardware, where the hardware in the check list is sorted in descending order by use frequency;

sending, by the intelligent terminal, test data to the hardware in the check list one by one in sequence according to a preconfigured check frequency;

receiving, by the intelligent terminal, response data returned by the hardware according to the test data;

determining, by the intelligent terminal, whether the response data is equal to a preconfigured expected value;

if the intelligent terminal determines that the response data is equal to the preconfigured expected value, determining that the hardware runs normally; and if the intelligent terminal determines that the response data is not equal to the preconfigured expected value, determining that the hardware runs abnormally; where the determining, by the intelligent terminal, target hardware that runs abnormally further includes:

determining, by the intelligent terminal, the hardware that runs abnormally as the target hardware.

With reference to the first aspect of the embodiments of the present invention, in a second implementation manner of the first aspect of the embodiments of the present invention, the acquiring, by the intelligent terminal, exception information of the target hardware, and notifying a user that the target hardware runs abnormally further includes:

acquiring, by the intelligent terminal, exception information that includes an identifier of the target hardware and a cause of abnormal running of the target hardware; and generating, by the intelligent terminal, a prompt window for displaying the exception information.

With reference to the first aspect of the embodiments of the present invention, in a third implementation manner of the first aspect of the embodiments of the present invention, the acquiring, by the intelligent terminal, exception information of the target hardware, and notifying a user that the target hardware runs abnormally further includes:

acquiring, by the intelligent terminal, exception information that includes an identifier of the target hardware, a cause of abnormal running of the target hardware, and an identifier of an application program that invokes the target hardware; and generating, by the intelligent terminal, a prompt window for displaying the exception information.

A second aspect of the embodiments of the present invention provides an intelligent terminal for checking whether hardware runs abnormally, where the intelligent terminal includes:

a checking unit, configured to check, at a service layer, whether load of an intelligent terminal system exceeds a preconfigured maximum threshold;

a triggering unit, configured to: if the checking unit detects that the load of the intelligent terminal system does not exceed the maximum threshold, trigger, at the service layer, execution of determining whether hardware runs abnormally;

a judging unit, configured to determine whether the hardware runs abnormally;

a determining unit, configured to determine target hardware that runs abnormally; and an acquiring unit, configured to acquire exception information of the target hardware, and notify a user that the target hardware runs abnormally.

With reference to the second aspect of the embodiments of the present invention, in a first implementation manner of the second aspect of the embodiments of the present invention, the judging unit further includes:

an acquiring subunit, configured to acquire a use frequency of the hardware;

a creation subunit, configured to create a check list according to the use frequency of the hardware, where the hardware in the check list is sorted in descending order by use frequency;

a sending subunit, configured to send test data to the hardware in the check list one by one in sequence according to a preconfigured check frequency;

a receiving subunit, configured to receive response data returned by the hardware according to the test data;

a judging subunit, configured to determine whether the response data is equal to a preconfigured expected value;

a first determining subunit, configured to: if the judging subunit determines that the response data is equal to the preconfigured expected value, determine that the hardware runs normally; and a second determining subunit, configured to: if the judging subunit determines that the response data is not equal to the preconfigured expected value, determine that the hardware runs abnormally; where the determining unit is further configured to determine the hardware, which is determined by the second determining subunit, as the target hardware.

With reference to the second aspect of the embodiments of the present invention, in a second implementation manner of the second aspect of the embodiments of the present invention, the acquiring unit further includes:

a first acquiring subunit, configured to acquire exception information that includes an identifier of the target hardware and a cause of abnormal running of the target hardware; and a first generation subunit, configured to generate a prompt window, where the prompt window is used for displaying the exception information acquired by the first acquiring subunit.

With reference to the second aspect of the embodiments of the present invention, in a third implementation manner of the second aspect of the embodiments of the present invention, the acquiring unit further includes:

a second acquiring subunit, configured to acquire exception information that includes an identifier of the target hardware, a cause of abnormal running of the target hardware, and an identifier of an application program that invokes the target hardware; and a second generation subunit, configured to generate a prompt window, where the prompt window is used for displaying the exception information obtained by the second acquiring subunit.

A third aspect of the embodiments of the present invention provides an intelligent terminal, where the intelligent terminal includes a screen, a memory, and one or more central processing units, where the central processing unit specifically performs the following steps:

checking, at a service layer, whether load of an intelligent terminal system exceeds a preconfigured maximum threshold;

if it is detected that the load of the intelligent terminal system does not exceed the maximum threshold, triggering, at the service layer, execution of determining whether hardware runs abnormally;

determining whether the hardware runs abnormally;

determining target hardware that runs abnormally; and acquiring exception information of the target hardware, and notifying a user that the target hardware runs abnormally.

With reference to the third aspect of the embodiments of the present invention, in a first implementation manner of the third aspect of the embodiments of the present invention, the central processing unit specifically performs the following steps:

acquiring a use frequency of the hardware;

creating a check list according to the use frequency of the hardware, where the hardware in the check list is sorted in descending order by use frequency;

sending test data to the hardware in the check list one by one in sequence according to a preconfigured check frequency;

receiving response data returned by the hardware according to the test data;

determining whether the response data is equal to a preconfigured expected value;

if the response data is equal to the preconfigured expected value, determining that the hardware runs normally;

if the response data is not equal to the preconfigured expected value, determining that the hardware runs abnormally; and determining the hardware that runs abnormally as the target hardware.

The embodiments of the present invention provide a method for checking whether hardware of an intelligent terminal runs abnormally and an intelligent terminal. In the embodiments of the present invention, when load of an intelligent terminal system is light, an intelligent terminal triggers execution of determining whether hardware runs abnormally; the intelligent terminal determines whether the hardware runs abnormally and determines, according to a result of the determining, target hardware that runs abnormally; and the intelligent terminal acquires exception information of the target hardware, and notifies a user that the target hardware runs abnormally. In the embodiments of the present invention, the intelligent terminal determines, at a service layer, whether the hardware runs abnormally, so that the intelligent terminal can actively check the hardware without a need to pre-install an application program for checking the hardware and to invoke the application program, and further, the intelligent terminal can actively identify the hardware that runs abnormally. In addition, in the embodiments, only when the load of the intelligent terminal system is light, does the intelligent terminal trigger execution of determining whether the hardware runs abnormally. This avoids increasing load of the intelligent terminal system and thereby ensures that the intelligent terminal runs normally.

DETAILED DESCRIPTION

An embodiment of the present invention provides a method for checking whether hardware of an intelligent terminal runs abnormally, so that the intelligent terminal can actively check the hardware.

Figure 1:
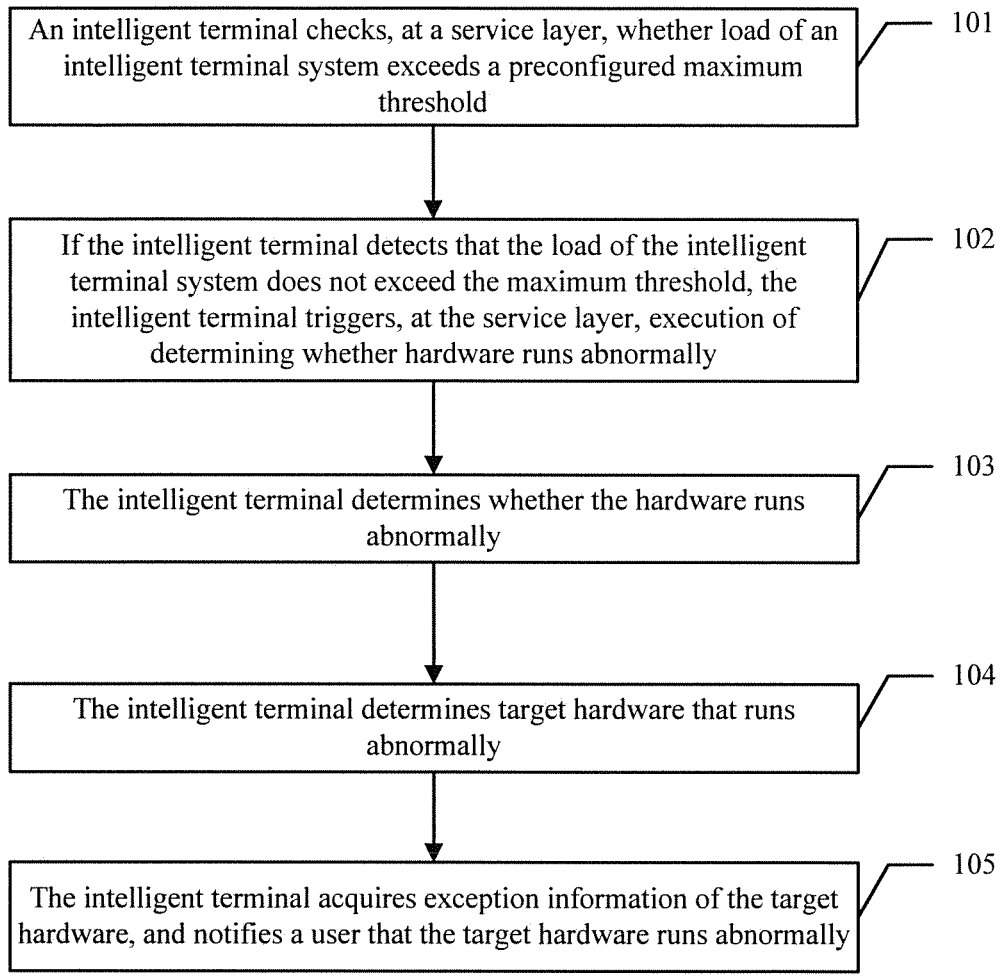
FIG. 1 is a flowchart of steps of an embodiment of a method for checking whether hardware of an intelligent terminal runs abnormally according to embodiments of the present invention.

With reference to FIG. 1, the following describes in detail the method for checking whether hardware of an intelligent terminal runs abnormally provided in this embodiment of the present invention.

101: An intelligent terminal checks, at a service layer, whether load of an intelligent terminal system exceeds a preconfigured maximum threshold.

The intelligent terminal sets the maximum threshold in advance according to configuration of the intelligent terminal system, so that the intelligent terminal can acquire a specific load status of the intelligent terminal system according to the maximum threshold.

The intelligent terminal can determine the load of the intelligent terminal system according to CPU usage of the intelligent terminal and a use frequency of hardware.

The intelligent terminal compares the determined load of the intelligent terminal system and the maximum threshold, so that the intelligent terminal can determine, according to a comparison result, whether the load of the intelligent terminal system is heavy.

In addition, the intelligent terminal checks, at the service layer, the load of the intelligent terminal system, so that the intelligent terminal can actively check the load of the intelligent terminal system, a user does not need to install an application program for checking the load of the system subsequently, and the user does not need to actively invoke the application program during use of the intelligent terminal.

102: If the intelligent terminal detects that the load of the intelligent terminal system does not exceed the maximum threshold, the intelligent terminal triggers, at the service layer, execution of determining whether hardware runs abnormally.

If the intelligent terminal detects that the load of the intelligent terminal system does not exceed the maximum threshold, it indicates that the load of the intelligent terminal system is light. In this case, the intelligent terminal triggers execution of determining whether the hardware runs abnormally. This can effectively avoid impact on another application program running in the intelligent terminal system, and does not affect a running speed of the intelligent terminal system.

Specifically, if the intelligent terminal detects that the load of the intelligent terminal system does not exceed the maximum threshold, the intelligent terminal generates a trigger instruction that is used to trigger execution of determining whether the hardware runs abnormally.

Because the intelligent terminal triggers, at the service layer, execution of determining whether the hardware runs abnormally, and therefore, the application program for checking the hardware does not need to be installed subsequently, the application program does not need to be invoked actively during use of the intelligent terminal, and the intelligent terminal can actively trigger execution of determining whether the hardware runs abnormally.

103: The intelligent terminal determines whether the hardware runs abnormally.

The intelligent terminal determines, according to the trigger instruction, whether the hardware runs abnormally.

104: The intelligent terminal determines target hardware that runs abnormally.

The intelligent terminal determines the hardware that runs abnormally as the target hardware.

105: The intelligent terminal acquires exception information of the target hardware, and notifies a user that the target hardware runs abnormally.

The intelligent terminal notifies, to the user, the exception information obtained by the intelligent terminal, so that the user can take a corresponding measure in a timely manner according to the exception information, thereby avoiding impact brought by a hardware exception.

In this embodiment, when load of an intelligent terminal system is light, an intelligent terminal triggers execution of determining whether hardware runs abnormally, and the intelligent terminal determines hardware that runs abnormally as target hardware, acquires exception information of the target hardware, and notifies a user that the target hardware runs abnormally. In this embodiment, the intelligent terminal can actively check the load of the intelligent terminal system and actively trigger execution of determining whether the hardware runs abnormally, so that the user does not need to install an application program or invoke the corresponding application program during use of the intelligent terminal, and further, the intelligent terminal can actively identify the hardware that runs abnormally.

The embodiment shown in FIG. 1 describes how the intelligent terminal checks whether the hardware runs abnormally. With reference to an embodiment shown in FIG. 2, the following describes how an intelligent terminal specifically determines target hardware.

201: An intelligent terminal checks, at a service layer, whether load of an intelligent terminal system exceeds a preconfigured maximum threshold. If yes, step 202 is performed; if no, step 203 is performed.

The intelligent terminal may check the load of the intelligent terminal system according to a preconfigured check period, where the check period is set by a manufacturer.

The check period may be fixed, that is, the intelligent terminal checks the load of the intelligent terminal system every other check period.

The check period may be unfixed. That is, if the intelligent terminal detects that the load of the intelligent terminal system is light, the intelligent terminal periodically perform a check according to the check period; if the intelligent terminal detects that the load of the intelligent terminal system is heavy, the intelligent terminal extends the check period.

202: The intelligent terminal does not trigger execution of determining whether hardware runs abnormally.

203: The intelligent terminal triggers execution of determining whether hardware runs abnormally.

If the intelligent terminal detects that the load of the intelligent terminal system does not exceed the maximum threshold, the intelligent terminal generates a trigger instruction that is used to trigger execution of determining whether the hardware runs abnormally.

204: The intelligent terminal acquires a use frequency of the hardware.

The intelligent terminal acquires the use frequency of the hardware according to the trigger instruction.

205: The intelligent terminal creates a check list according to the use frequency of the hardware.

The hardware in the check list is sorted in descending order by use frequency. Hardware ranked in front is likely to be invoked by an application program; therefore, the intelligent terminal checks the hardware according to the check list, and can check frequently used hardware in a timely manner, which avoids impact brought by a running exception of the frequently used hardware to the intelligent terminal.

It should be cleared that, in this embodiment, frequently used hardware is ranked in front in the check list, but a manner of determining a sequence of the hardware in the check list is not merely limited to this manner, and another manner may be used. For example, sorting may be performed in the check list according to installation time of application programs, that is, hardware invoked by an application program newly installed by the user is ranked in front.

206: The intelligent terminal sends test data to the hardware in the check list one by one in sequence according to a preconfigured check frequency.

Hardware ranked in front in the check list is more likely to be invoked by an application program than hardware ranked behind. The intelligent terminal checks the intelligent terminal according to a sequence in the check list, and thereby can detect, in a timely manner, a case in which frequently invoked hardware runs abnormally.

The check frequency is set by the manufacturer, where the check frequency may be fixed or may be unfixed.

For example, the intelligent terminal can determine whether an application program invokes hardware frequently. If the application program invokes the hardware frequently, it indicates that the hardware needs to be used frequently, and the check frequency may be decreased, so that the intelligent terminal can identify hardware that runs abnormally in a timely manner.

If an application program of the intelligent terminal seldom invokes hardware, it indicates that the hardware is not used frequently, and the check frequency may be increased, so as to reduce power consumption for the intelligent terminal to send test data.

207: The intelligent terminal receives response data returned by the hardware according to the test data.

208: The intelligent terminal determines whether the response data is equal to a preconfigured expected value. If the intelligent terminal determines that the response data is equal to the preconfigured expected value, step 209 is performed; if the intelligent terminal determines that the response data is not equal to the preconfigured expected value, step 210 is performed.

The expected value is set by the manufacturer, and is used to determine whether the hardware runs abnormally.

209: Determine that the hardware runs normally.

210: Determine that the hardware runs abnormally.

211: The intelligent terminal determines the hardware that runs abnormally as target hardware.

That is, the intelligent terminal determines the hardware whose returned response data is not equal to the expected value as the target hardware.

212: The intelligent terminal acquires exception information of the target hardware, and notifies a user that the target hardware runs abnormally.

The process of step 212 in this embodiment is the same as the process of step 105 shown in FIG. 1, and details are not repeatedly described herein.

In this embodiment, an intelligent terminal creates a check list, where hardware in the check list is sorted in descending order by use frequency; and the intelligent terminal sends test data to the hardware according to the check list, and determines, according to response data returned by the hardware, target hardware that runs abnormally. In this embodiment, hardware that is invoked at a high frequency has a relatively high check priority, and the intelligent terminal successively checks, according to a sequence in the check list, whether the hardware runs abnormally, so that the intelligent terminal can detect, in a timely manner, a case in which the frequently invoked hardware runs abnormally.

Figure 2:
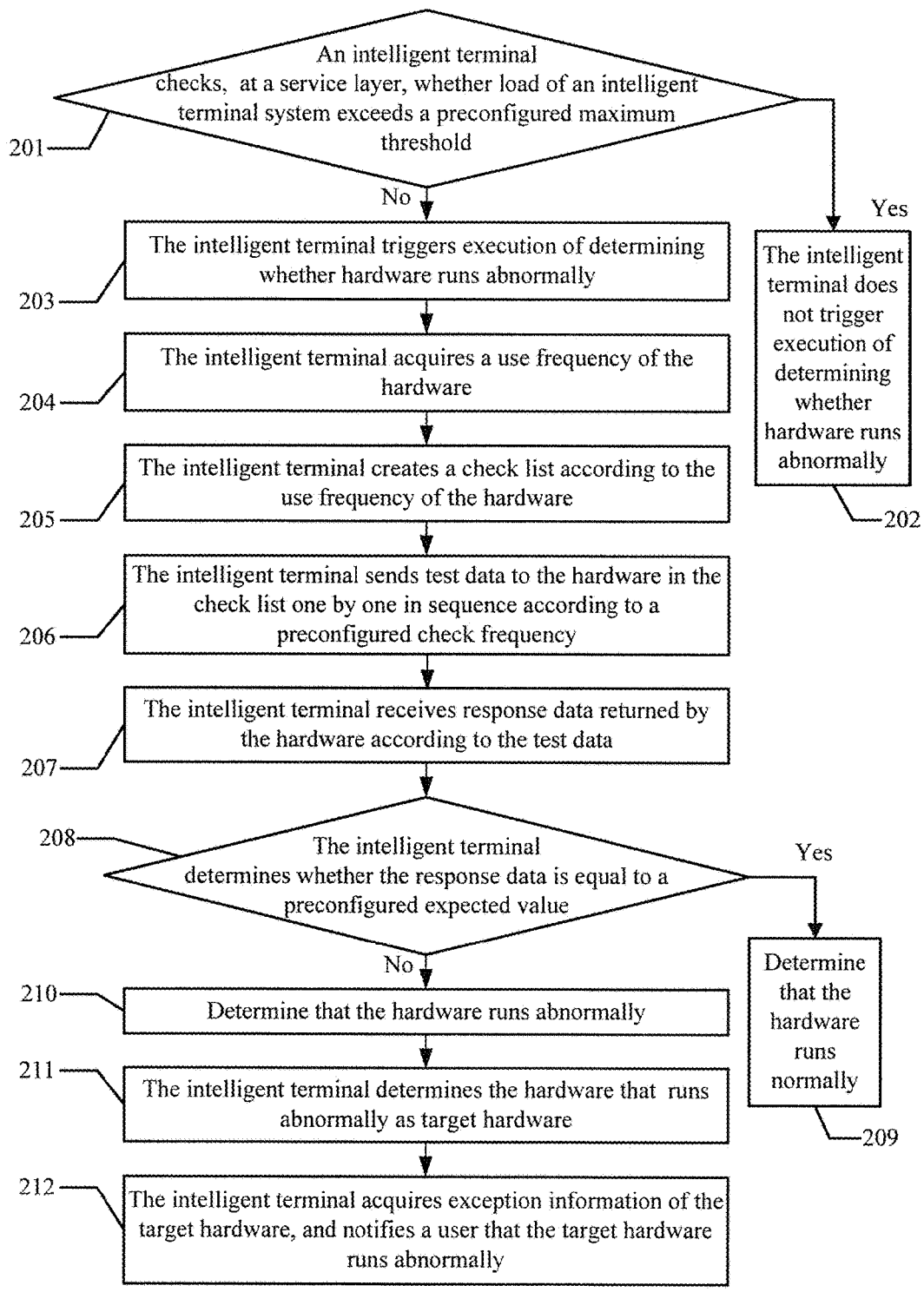
FIG. 2 is a flowchart of steps of another embodiment of a method for checking whether hardware of an intelligent terminal runs abnormally according to embodiments of the present invention.

The embodiment shown in FIG. 2 describes how the intelligent terminal determines the target hardware specifically. With reference to an embodiment shown in FIG. 3, the following describes how an intelligent terminal specifically notifies, to a user, the hardware that runs abnormally.

301: An intelligent terminal checks, at a service layer, whether load of an intelligent terminal system exceeds a preconfigured maximum threshold. If yes, step 302 is performed; if no, step 303 is performed.

302: The intelligent terminal does not trigger execution of determining whether hardware runs abnormally.

303: The intelligent terminal triggers execution of determining whether hardware runs abnormally.

304: The intelligent terminal acquires a use frequency of the hardware.

305: The intelligent terminal creates a check list according to the use frequency of the hardware.

306: The intelligent terminal sends test data to the hardware in the check list one by one in sequence according to a preconfigured check frequency.

307: The intelligent terminal receives response data returned by the hardware according to the test data.

308: The intelligent terminal determines whether the response data is equal to a preconfigured expected value. If the intelligent terminal determines that the response data is equal to the preconfigured expected value, step 309 is performed; if the intelligent terminal determines that the response data is not equal to the preconfigured expected value, step 310 is performed.

309: Determine that the hardware runs normally.

310: Determine that the hardware runs abnormally.

311: The intelligent terminal determines the hardware that runs abnormally as target hardware.

The process of step 301 through step 311 in this embodiment is the same as the process of step 201 through step 211 shown in FIG. 2, and details are not repeatedly described herein.

312: The intelligent terminal acquires exception information that includes an identifier of the target hardware and a cause of abnormal running of the target hardware.

The hardware identifier is generated by the intelligent terminal in advance and corresponds to the hardware. If the hardware runs abnormally, the intelligent terminal acquires the identifier corresponding to the hardware that runs abnormally.

After the intelligent terminal determines the hardware that runs abnormally, the exception information acquired by the intelligent terminal further includes an exception cause of the hardware that runs abnormally, so that a user can perform processing on the failed hardware in a timely manner According to the exception cause, the user can obtain a solution quickly, thereby avoiding impact brought by a hardware exception to the user.

313: The intelligent terminal generates a prompt window for displaying the exception information.

After obtaining the exception information, the intelligent terminal generates the prompt window on a screen of the intelligent terminal, where the prompt window may display the exception information, so that the intelligent terminal can notify the obtained exception information to the user in a timely manner.

In this embodiment, an intelligent terminal can detect target hardware that runs abnormally, acquire exception information that includes an identifier of the target hardware and a cause of abnormal running of the target hardware, and notify, by using a prompt window, the obtained exception information to a user. In this embodiment, the intelligent terminal can acquire the exception cause of the target hardware that runs abnormally, thereby greatly improving the efficiency of resolving the hardware that runs abnormally, and further reducing impact brought by the hardware that runs abnormally to the intelligent terminal.

Figure 3:
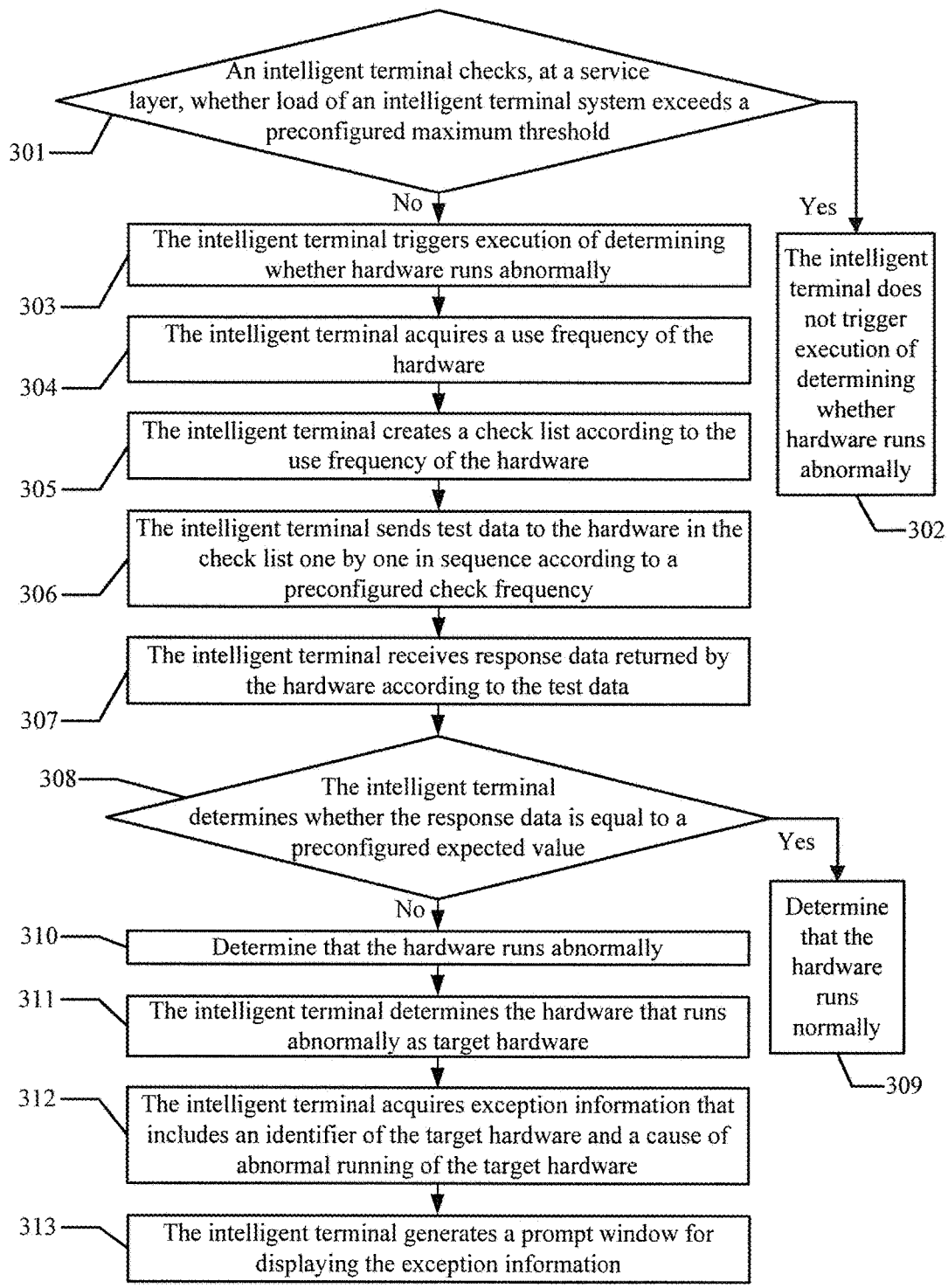
FIG. 3 is a flowchart of steps of another embodiment of a method for checking whether hardware of an intelligent terminal runs abnormally according to embodiments of the present invention.
Figure 4:
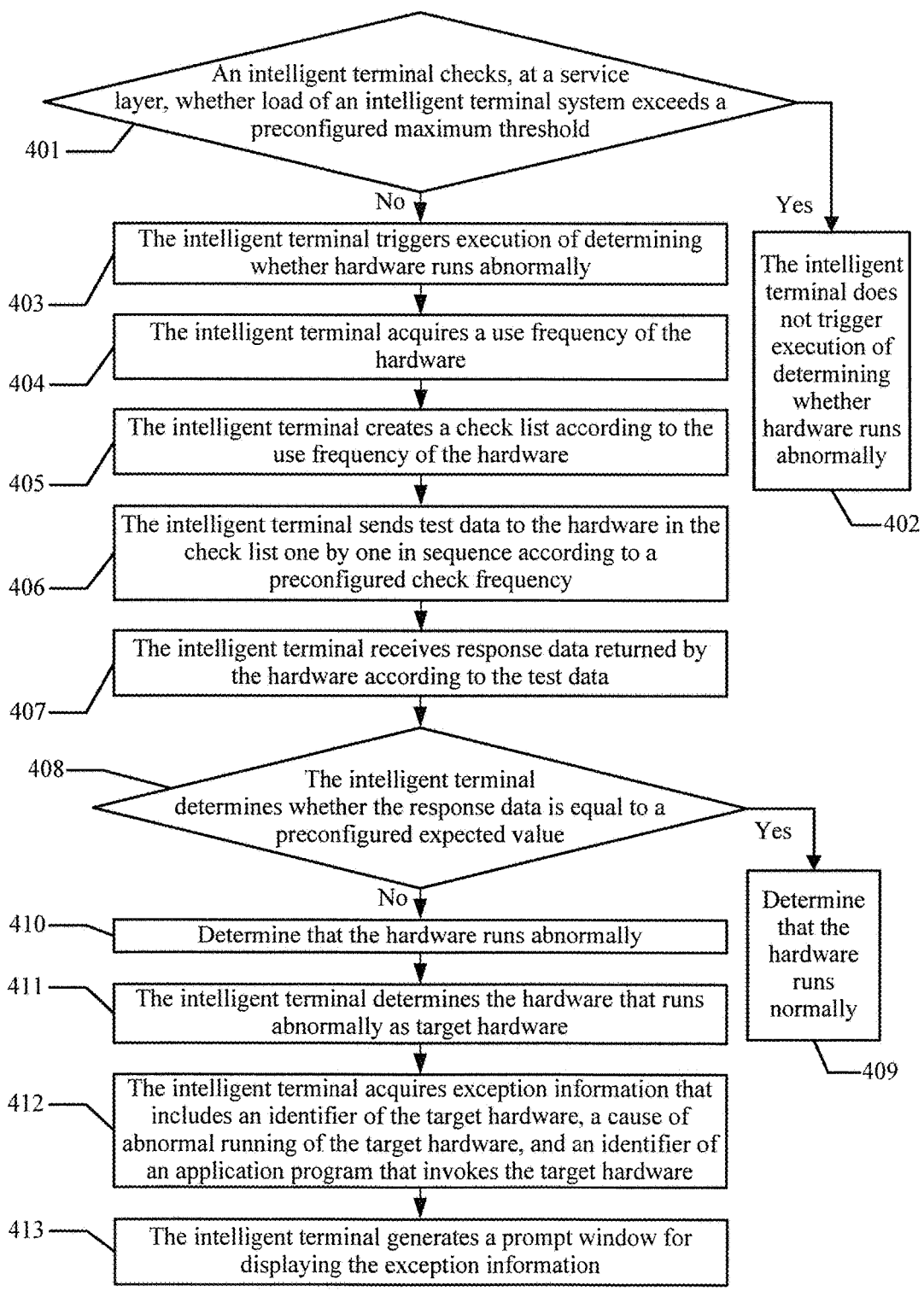
FIG. 4 is a flowchart of steps of another embodiment of a method for checking whether hardware of an intelligent terminal runs abnormally according to embodiments of the present invention.

The embodiment shown in FIG. 3 describes how the intelligent terminal notifies, to the user, the identifier and the exception cause of the hardware that runs abnormally. With reference to an embodiment shown in FIG. 4, the following describes how an intelligent terminal notifies, to a user, an application program that invokes hardware that runs abnormally.

401: An intelligent terminal checks, at a service layer, whether load of an intelligent terminal system exceeds a preconfigured maximum threshold. If yes, step 402 is performed; if no, step 403 is performed.

402: The intelligent terminal does not trigger execution of determining whether hardware runs abnormally.

403: The intelligent terminal triggers execution of determining whether hardware runs abnormally.

404: The intelligent terminal acquires a use frequency of the hardware.

405: The intelligent terminal creates a check list according to the use frequency of the hardware.

406: The intelligent terminal sends test data to the hardware in the check list one by one in sequence according to a preconfigured check frequency.

407: The intelligent terminal receives response data returned by the hardware according to the test data.

408: The intelligent terminal determines whether the response data is equal to a preconfigured expected value. If the intelligent terminal determines that the response data is equal to the preconfigured expected value, step 409 is performed; if the intelligent terminal determines that the response data is not equal to the preconfigured expected value, step 410 is performed.

409: Determine that the hardware runs normally.

410: Determine that the hardware runs abnormally.

411: The intelligent terminal determines the hardware that runs abnormally as target hardware.

The process of step 401 through step 411 in this embodiment is the same as the process of step 301 through step 311 shown in FIG. 3, and details are not repeatedly described herein.

412: The intelligent terminal acquires exception information that includes an identifier of the target hardware, a cause of abnormal running of the target hardware, and an identifier of an application program that invokes the target hardware.

For the identifier and the exception information, generated by the intelligent terminal, of the hardware that runs abnormally, refer to step 312 shown in FIG. 3.

In this embodiment, to reduce impact brought by the hardware that runs abnormally, the intelligent terminal further acquires the identifier of the application program that invokes the target hardware.

Specifically, when determining the hardware that runs abnormally, the intelligent terminal determines the application program that invokes the hardware, so that according to the exception information, a user can not only obtain the specific hardware that runs abnormally and the exception cause of the hardware that runs abnormally, but also obtain the application program that cannot be used normally because of the hardware that runs abnormally.

413: The intelligent terminal generates a prompt window for displaying the exception information.

The intelligent terminal displays the prompt window by using a screen, so that the intelligent terminal notifies, to the user by using the prompt window, the exception information that includes the identifier of the target hardware, the cause of abnormal running of the target hardware, and the identifier of the application program that invokes the target hardware.

In this embodiment, an intelligent terminal can detect target hardware that runs abnormally, acquire exception information that includes an identifier of the target hardware, a cause of abnormal running of the target hardware, and an identifier of an application program that invokes the target hardware, and notify, by using a prompt window, the obtained exception information to a user. In this embodiment, the intelligent terminal can acquire the exception cause of the target hardware that runs abnormally, thereby greatly improving the efficiency of resolving the hardware that runs abnormally.

In addition, the intelligent terminal can acquire the application program that cannot be used normally because of invocation of the target hardware, thereby avoiding that the intelligent terminal starts the application program that cannot run normally.

For better understanding of this embodiment of the present invention, a specific application scenario is used to describe in detail the method for checking whether hardware of an intelligent terminal runs abnormally provided in this embodiment of the present invention.

An intelligent terminal acquires load of an intelligent terminal system according to CPU usage of the intelligent terminal.

The intelligent terminal checks, according to a preconfigured check period, whether the load of the intelligent terminal system exceeds a preconfigured maximum threshold.

The maximum threshold may be specifically set according to a specific application scenario of the intelligent terminal. In this application scenario, the maximum threshold may be set to 30%.

The intelligent terminal compares the load of the intelligent terminal system with the maximum threshold.

If the intelligent terminal detects that the load of the intelligent terminal system exceeds the preconfigured maximum threshold (30%), that is, in this application scenario, the CPU usage of the intelligent terminal exceeds the maximum threshold, the intelligent terminal triggers execution of determining whether an exception occurs in hardware.

When determining that the load of the intelligent terminal system exceeds the preconfigured maximum threshold, the intelligent terminal generates a trigger instruction.

The intelligent terminal acquires use frequencies of all hardware according to the trigger instruction.

The intelligent terminal creates a check list according to the use frequencies of the hardware.

The hardware in the check list is sorted in descending order by use frequency.

In this application scenario, a sequence in the check list is: a navigation module, an acceleration sensor, a temperature sensor, a gyro, and a light sensor module.

The intelligent terminal sends test data to the hardware in the check list one by one in sequence according to a preconfigured check frequency.

That is, the intelligent terminal sends test data to the navigation module first, and sends test data to the light sensor module last.

For different hardware, the intelligent terminal sends different test data. Specifically, the intelligent terminal sends, to the hardware, a request for reading a working status register, and determines the test data according to a response returned by the hardware.

The intelligent terminal receives response data returned by the hardware according to the test data.

The response data may be a value of the working status register of the hardware itself.

The intelligent terminal separately determines whether response data of the navigation module, the acceleration sensor, temperature sensor, the gyro, and the light sensor module is equal to a preconfigured expected value.

The expected value is set uniformly by different hardware vendors at delivery.

The intelligent terminal confirms that hardware whose response data is equal to the expected value runs normally, and confirms that hardware whose response data is not equal to the expected value runs abnormally.

In this application scenario, the intelligent terminal determines that the response data returned by the navigation module is not equal to the expected value, and the intelligent terminal determines that the navigation module runs abnormally.

The intelligent terminal determines the navigation module as target hardware.

The intelligent terminal acquires an identifier of the navigation module, where the identifier may be a name of the navigation module in Chinese or English, or a name expressed in another language.

The intelligent terminal acquires an exception cause of the navigation module. In this application scenario, the exception cause may be that the hardware is damaged.

The intelligent terminal may further acquire an application program that invokes the navigation module. That is, in this application scenario, the application program that invokes the navigation module and that is obtained by the intelligent terminal is Baidu map navigation.

The intelligent terminal generates a prompt window, where the prompt window may be displayed on a screen of the intelligent terminal.

The intelligent terminal notifies the exception information of the navigation module to a user by using the prompt window.

The user obtains, by using the prompt window, that the hardware in which an exception occurs is the navigation module, the application program that cannot be used is the Baidu map navigation, and a possible exception cause is that the hardware is damaged. The user may take a measure, for example, fixing or replacing the hardware.

In the foregoing embodiments, a detailed description is made for the method for checking whether hardware of an intelligent terminal runs abnormally. With reference to an embodiment shown in FIG. 5, the following describes in detail a specific structure of an intelligent terminal for checking whether hardware runs abnormally.

Figure 5:
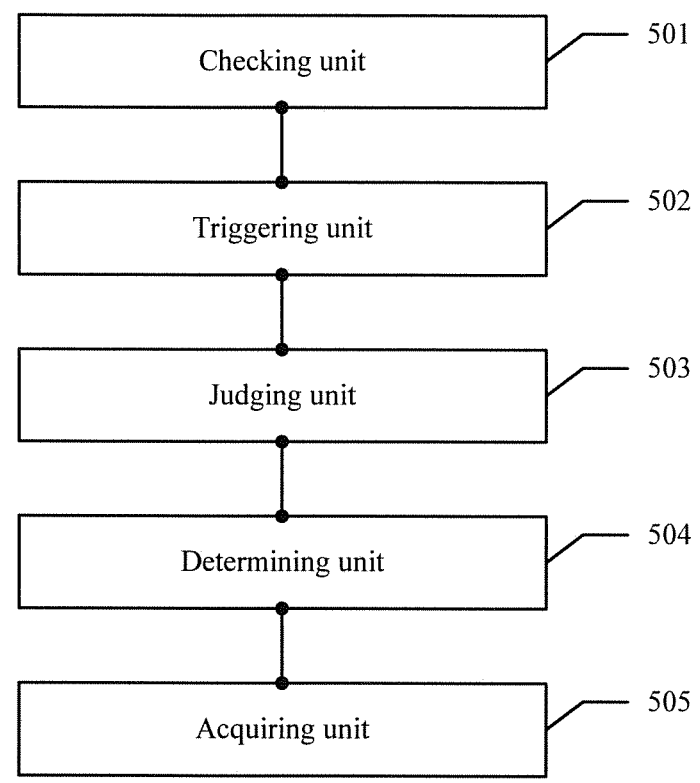
FIG. 5 is a schematic structural diagram of an embodiment of an intelligent terminal according to embodiments of the present invention.

As known from FIG. 5, the intelligent terminal specifically includes:

a checking unit 501, configured to check, at a service layer, whether load of an intelligent terminal system exceeds a preconfigured maximum threshold;

a triggering unit 502, configured to: if the checking unit 501 detects that the load of the intelligent terminal system does not exceed the maximum threshold, trigger, at the service layer, execution of determining whether hardware runs abnormally;

a judging unit 503, configured to determine whether the hardware runs abnormally;

a determining unit 504, configured to determine target hardware that runs abnormally; and an acquiring unit 505, configured to acquire exception information of the target hardware, and notify a user that the target hardware runs abnormally.

In this embodiment, if a checking unit 501 detects that load of an intelligent terminal system does not exceed a maximum threshold, a triggering unit 502 triggers, at a service layer, execution of determining whether hardware runs abnormally, a determining unit 504 determines, according to a result of determining made by a judging unit 503, target hardware that runs abnormally, and an acquiring unit 505 acquires exception information of the target hardware, and notifies a user that the target hardware runs abnormally. In this embodiment, the checking unit 501 can actively check the load of the intelligent terminal system, and the judging unit 503 can actively trigger execution of determining whether the hardware runs abnormally, so that the user does not need to install an application program or invoke the corresponding application program during use of the intelligent terminal, and further, the determining unit 504 can actively identify the hardware that runs abnormally.

In the embodiment shown in FIG. 5, a detailed description is made for the specific structure of the intelligent terminal. With reference to an embodiment shown in FIG. 6, the following describes in detail a specific structure of a judging unit of an intelligent terminal. The intelligent terminal specifically includes:

a checking unit 601, configured to check, at a service layer, whether load of an intelligent terminal system exceeds a preconfigured maximum threshold;

a triggering unit 602, configured to: if the checking unit 601 detects that the load of the intelligent terminal system does not exceed the maximum threshold, trigger, at the service layer, execution of determining whether hardware runs abnormally;

a judging unit 603, configured to determine whether the hardware runs abnormally;

a determining unit 604, configured to determine target hardware that runs abnormally; and an acquiring unit 605, configured to acquire exception information of the target hardware, and notify a user that the target hardware runs abnormally.

The judging unit 603 further includes:

an acquiring subunit 6031, configured to acquire a use frequency of the hardware;

a creation subunit 6032, configured to create a check list according to the use frequency of the hardware, where the hardware in the check list is sorted in descending order by use frequency;

a sending subunit 6033, configured to send test data to the hardware in the check list one by one in sequence according to a preconfigured check frequency;

a receiving subunit 6034, configured to receive response data returned by the hardware according to the test data;

a judging subunit 6035, configured to determine whether the response data is equal to a preconfigured expected value;

a first determining subunit 6036, configured to: if the judging subunit 6035 determines that the response data is equal to the preconfigured expected value, determine that the hardware runs normally; and a second determining subunit 6037, configured to: if the judging subunit 6035 determines that the response data is not equal to the preconfigured expected value, determine that the hardware runs abnormally; where the determining unit 604 is further configured to determine the hardware, which is determined by the second determining subunit 6037, as the target hardware.

In this embodiment, a creation subunit 6032 creates a check list according to a use frequency of hardware, where the hardware in the check list is sorted in descending order by use frequency; a sending subunit 6033 sends test data to the hardware in the check list one by one in sequence according to a preconfigured check frequency; a second determining subunit 6037 is configured to: if a judging subunit 6035 determines that response data is not equal to a preconfigured expected value, determine that the hardware runs abnormally; and a determining unit 604 determines the hardware, which is determined by the second determining subunit 6037, as target hardware. In this embodiment, hardware that is invoked at a high frequency has a relatively high check priority, and the judging subunit 6035 successively checks, according to a sequence in the check list, whether the hardware runs abnormally, so that the second determining subunit 6037 can detect, in a timely manner, a case in which an exception occurs in the frequently invoked hardware.

Figure 6:
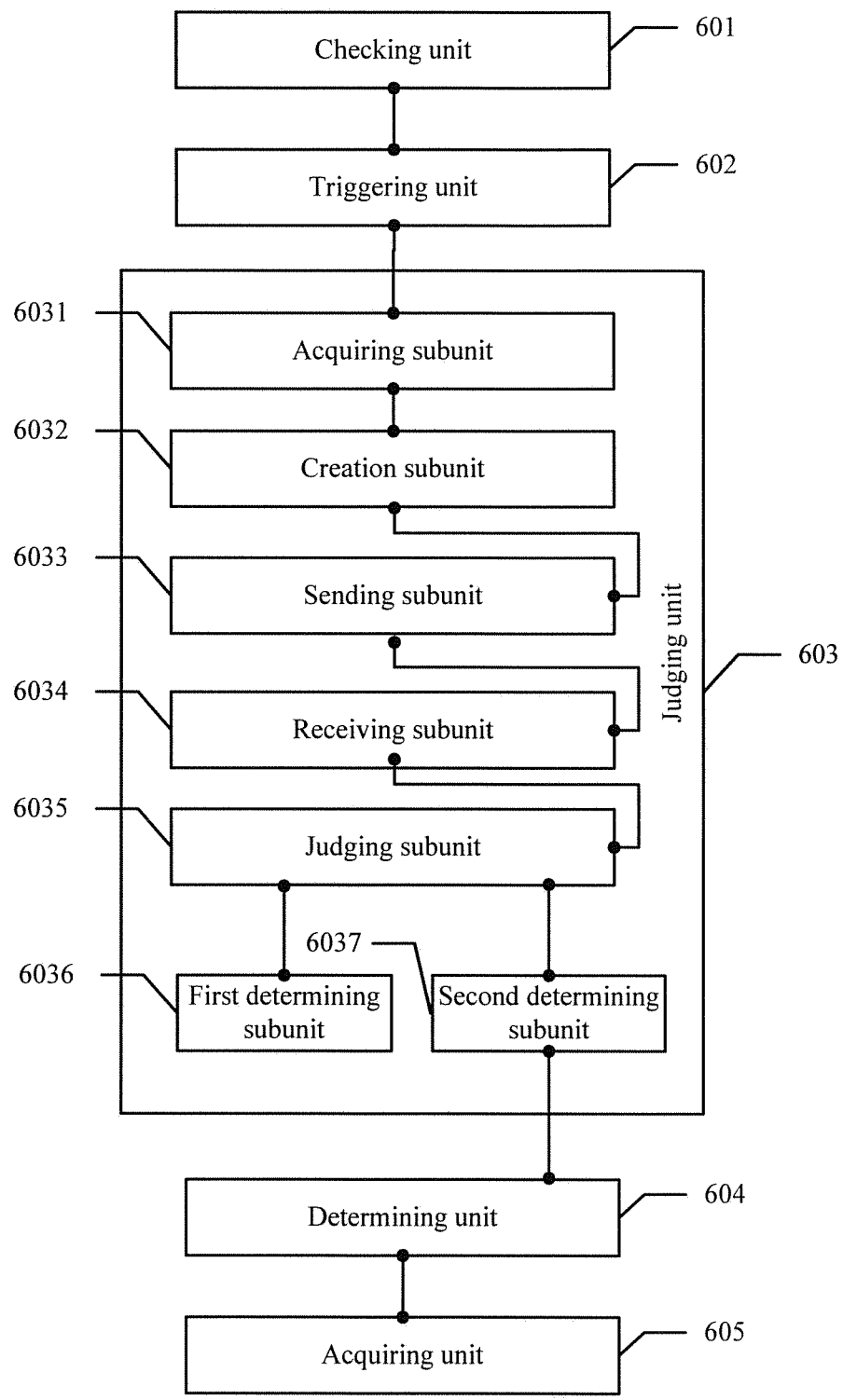
FIG. 6 is a schematic structural diagram of another embodiment of an intelligent terminal according to embodiments of the present invention.

In the embodiment shown in FIG. 6, a detailed description is made for the specific structure of the judging unit of the intelligent terminal. With reference to an embodiment shown in FIG. 7, the following describes in detail a specific structure of an acquiring unit of an intelligent terminal. The intelligent terminal specifically includes:

a checking unit 701, configured to check, at a service layer, whether load of an intelligent terminal system exceeds a preconfigured maximum threshold;

a triggering unit 702, configured to: if the checking unit 701 detects that the load of the intelligent terminal system does not exceed the maximum threshold, trigger, at the service layer, execution of determining whether hardware runs abnormally;

a judging unit 703, configured to determine whether the hardware runs abnormally.

a determining unit 704, configured to determine target hardware that runs abnormally; and an acquiring unit 705, configured to acquire exception information of the target hardware, and notify a user that the target hardware runs abnormally.

The acquiring unit 705 further includes:

a first acquiring subunit 7051, configured to acquire exception information that includes an identifier of the target hardware and a cause of abnormal running of the target hardware; and a first generation subunit 7052, configured to generate a prompt window, where the prompt window is used for displaying the exception information acquired by the first acquiring subunit 7051.

In this embodiment, a first acquiring subunit 7051 acquires exception information, where the exception information includes an identifier of target hardware that runs abnormally and a cause of abnormal running of the target hardware, where the target hardware is determined by a determining unit 704; and a first generation subunit 7052 generates a prompt window, where the prompt window is used for displaying the exception information acquired by the first acquiring subunit 7051. In this embodiment, the first acquiring subunit 7051 can acquire the exception cause of the target hardware that runs abnormally, thereby greatly improving the efficiency of resolving the hardware that runs abnormally, and further reducing impact brought by the hardware that runs abnormally to an intelligent terminal.

Figure 7:
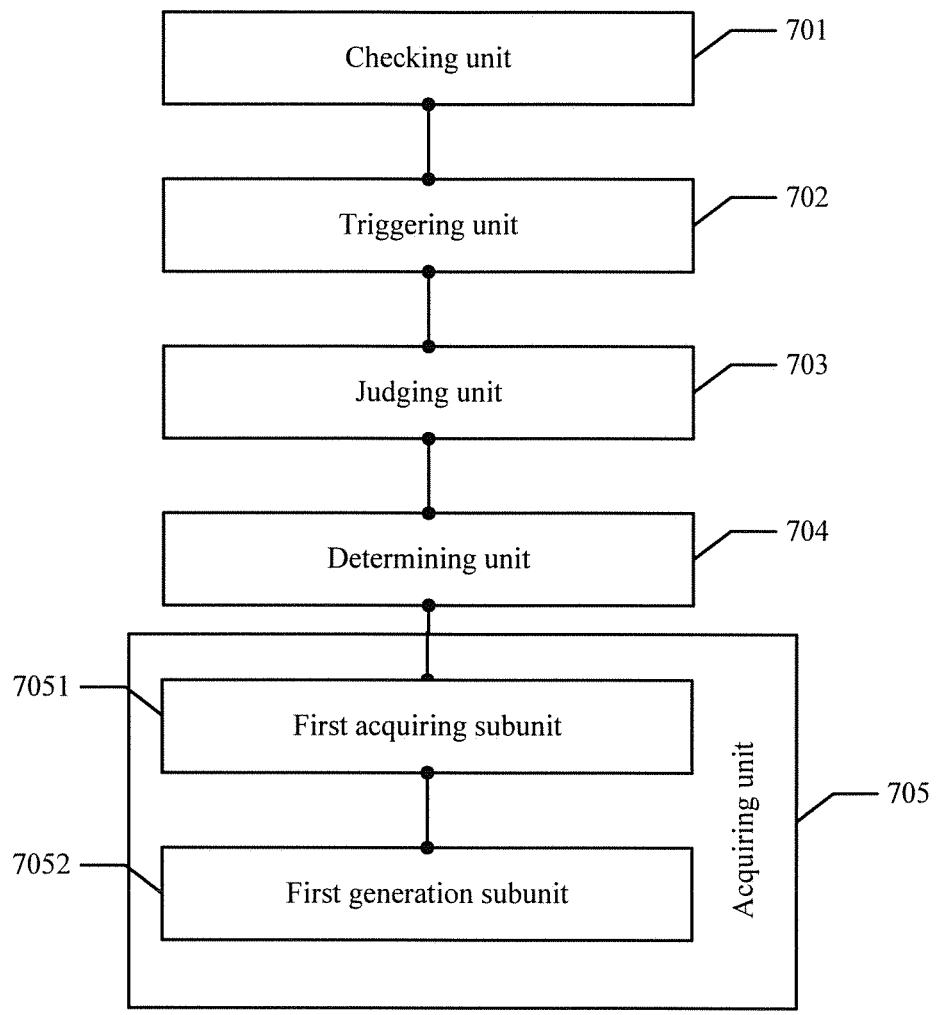
FIG. 7 is a schematic structural diagram of another embodiment of an intelligent terminal according to embodiments of the present invention.
Figure 8:
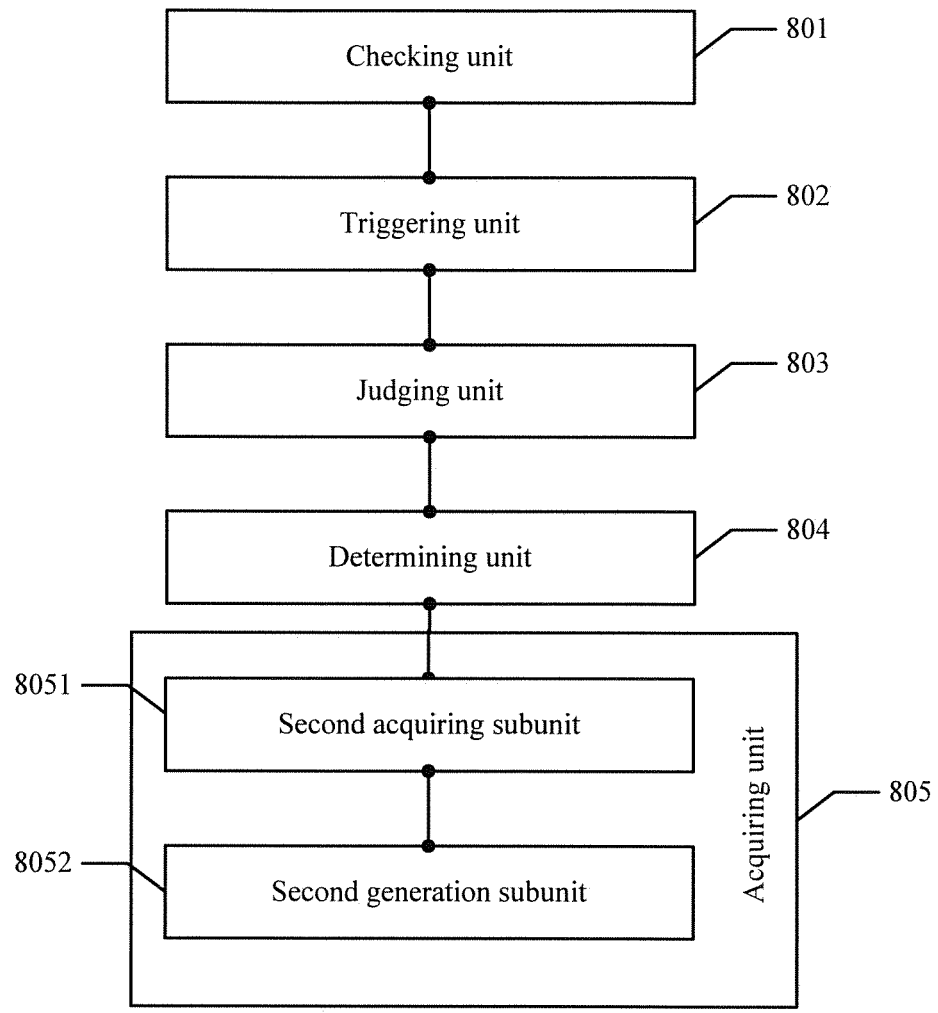
FIG. 8 is a schematic structural diagram of another embodiment of an intelligent terminal according to embodiments of the present invention.

In the embodiment shown in FIG. 7, a detailed description is made for the specific structure of the acquiring unit, which can acquire an identifier and an exception cause of target hardware, of the intelligent terminal. With reference to an embodiment shown in FIG. 8, the following describes in detail an acquiring unit that can acquire an identifier of target hardware, a cause of abnormal running of the target hardware, and an identifier of an application program that invokes the target hardware. An intelligent terminal specifically includes:

a checking unit 801, configured to check, at a service layer, whether load of an intelligent terminal system exceeds a preconfigured maximum threshold;

a triggering unit 802, configured to: if the checking unit 801 detects that the load of the intelligent terminal system does not exceed the maximum threshold, trigger, at the service layer, execution of determining whether hardware runs abnormally;

a judging unit 803, configured to determine whether the hardware runs abnormally;

a determining unit 804, configured to determine target hardware that runs abnormally; and an acquiring unit 805, configured to acquire exception information of the target hardware, and notify a user that the target hardware runs abnormally.

The acquiring unit 805 further includes:

a second acquiring subunit 8051, configured to acquire exception information that includes an identifier of the target hardware, a cause of abnormal running of the target hardware, and an identifier of an application program that invokes the target hardware; and a second generation subunit 8052, configured to generate a prompt window, where the prompt window is used for displaying the exception information obtained by the second acquiring subunit 8051.

In this embodiment, a second acquiring subunit 8051 acquires exception information, where the exception information includes an identifier of target hardware that runs abnormally, a cause of abnormal running of the target hardware, and an identifier of an application program that invokes the target hardware, where the target hardware is determined by a determining unit 804; and a second generation subunit 8052 generates a prompt window, where the prompt window is used for displaying the exception information obtained by the second acquiring subunit 8051. In this embodiment, the second acquiring subunit 8051 can acquire the exception cause of the target hardware that runs abnormally, thereby greatly improving the efficiency of resolving the hardware that runs abnormally, and further reducing impact brought by the hardware that runs abnormally to an intelligent terminal. In addition, the identifier of the application program that invokes the target hardware can be further acquired, thereby avoiding that the intelligent terminal starts an application program that cannot run normally.

For better understanding of the intelligent terminal provided in this embodiment of the present invention, the following further describes a specific structure of the intelligent terminal according to a specific application scenario.

The checking unit 601 acquires load of an intelligent terminal system according to CPU usage of the intelligent terminal.

That is, the checking unit 601 checks, according to a preconfigured check period, whether the load of the intelligent terminal system exceeds a preconfigured maximum threshold.

The maximum threshold may be specifically set according to a specific application scenario of the intelligent terminal. In this application scenario, the maximum threshold may be set to 30%.

The checking unit 601 compares the load of the intelligent terminal with the maximum threshold.

If the intelligent terminal detects that the load of the intelligent terminal system exceeds the preconfigured maximum threshold (30%), that is, in this application scenario, the CPU usage of the intelligent terminal exceeds the maximum threshold, the triggering unit 602 triggers execution of determining whether an exception occurs in hardware.

When it is determined that the load of the intelligent terminal system exceeds the preconfigured maximum threshold, the triggering unit 602 generates a trigger instruction, so as to trigger the judging unit 603 to determine whether the hardware runs abnormally.

Specifically, the acquiring subunit 6031 acquires use frequencies of all hardware according to the trigger instruction.

The creation subunit 6032 creates a check list according to the use frequencies of the hardware.

The hardware in the check list is sorted in descending order by use frequency.

In this application scenario, a sequence in the check list is: a navigation module, an acceleration sensor, a temperature sensor, a gyro, and a light sensor module.

The sending subunit 6033 sends test data to the hardware in the check list one by one in sequence according to a preconfigured check frequency.

That is, the sending subunit 6033 sends test data to the navigation module first, and sends test data to the light sensor module last.

For different hardware, the sending subunit 6033 sends different test data. Specifically, the sending subunit 6033 sends, to the hardware, a request for reading a working status register, and determines the test data according to a response returned by the hardware.

The receiving subunit 6034 receives response data returned by the hardware according to the test data.

The response data may be a value of the working status register of the hardware itself.

The judging subunit 6035 separately determines whether response data of the navigation module, the acceleration sensor, temperature sensor, the gyro, and the light sensor module is equal to a preconfigured expected value.

The expected value is set uniformly by different hardware vendors at delivery.

The first determining subunit 6036 determines that hardware whose response data is equal to the expected value runs normally.

The second determining subunit 6037 determines that hardware whose response data is not equal to the expected value runs abnormally.

In this application scenario, the second determining subunit 6037 determines that the response data returned by the navigation module is not equal to the expected value, and the second determining subunit 6037 determines that the navigation module runs abnormally.

The determining unit 604 determines the navigation module as target hardware.

The second acquiring subunit 8051 acquires an identifier of the navigation module, where the identifier may be a name of the navigation module in Chinese or English, or a name expressed in another language.

The second acquiring subunit 8051 acquires an exception cause of the navigation module. In this application scenario, the exception cause may be that the hardware is damaged.

The second acquiring subunit 8051 may further acquire an application program that invokes the navigation module. That is, in this application scenario, the application program that invokes the navigation module and that is obtained by the second acquiring subunit 8051 is Baidu map navigation.

The second generation subunit 8052 generates a prompt window, where the prompt window is displayed on a screen of the intelligent terminal.

The second generation subunit 8052 notifies the exception information of the navigation module to a user by using the prompt window.

The user obtains, by using the prompt window, that the hardware in which an exception occurs is the navigation module, the application program that cannot be used is the Baidu map navigation, and a possible exception cause is that the hardware is damaged. The user may take a measure, for example, fixing or replacing the hardware.

Figure 9:
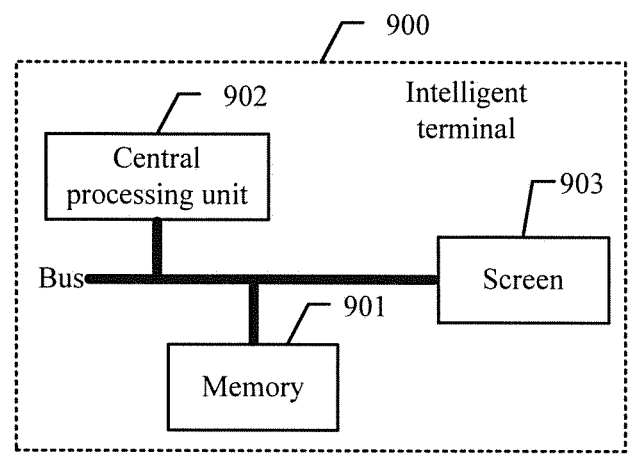
FIG. 9 is a schematic structural diagram of another embodiment of an intelligent terminal according to embodiments of the present invention.

In the embodiment shown in FIG. 5 to FIG. 8, the structure of the intelligent terminal is described in detail from the perspective of a module function entity. With reference to FIG. 9, the following describes a structure of an intelligent terminal in this embodiment of the present invention from the perspective of hardware. For details, refer to FIG. 9.

It should be understood that, the intelligent terminal 900 shown in the figure is merely an example provided in this embodiment of the present invention, and the intelligent terminal 900 may have more or less components than those shown in the figure, may combine two or more components, or may have different component configuration. Various components shown in the figure may be implemented by using hardware, software, or a combination of hardware and software including one or more signal processors and/or application-specific integrated circuits.

An intelligent terminal is used as an example for detailed description. As shown in FIG. 9, the intelligent terminal includes a memory 901, a central processing unit (Central Processing Unit, CPU for short) 902. There may be one or more central processing units 902 shown in FIG. 9. In the embodiment shown in FIG. 9, one central processing unit 902 is used as an example for description.

The intelligent terminal further includes a screen 903.

In some embodiments of the present invention, the screen 903, the central processing unit 902, and the memory 901 may be connected by using a bus or in another manner. In FIG. 9, the bus connection is used as an example.

It should be noted that the intelligent terminal provided in this embodiment is merely an example of the intelligent terminal provided in this embodiment of the present invention, and the intelligent terminal involved in this embodiment of the present invention may have more or less components than those shown in FIG. 9, may combine two or more components, or may have different component configuration or setting. Various components may be implemented by using hardware, software, or a combination of hardware and software including one or more signal processors and/or application-specific integrated circuits.

In the following, the terminal provided in this embodiment is described in detail.

The memory 901 is provided. The memory 901 may be accessed by the central processing unit 902, and the memory 901 may include a high-speed random access memory, or may further include a non-volatile memory, for example, one or more pieces of disk storage hardware, flash memory hardware, or another volatile solid-state memory hardware.

The screen 903 is provided. The screen 903 is used to display, to a user, a prompt window that displays a graph, a text, or an icon.

Figure 10:
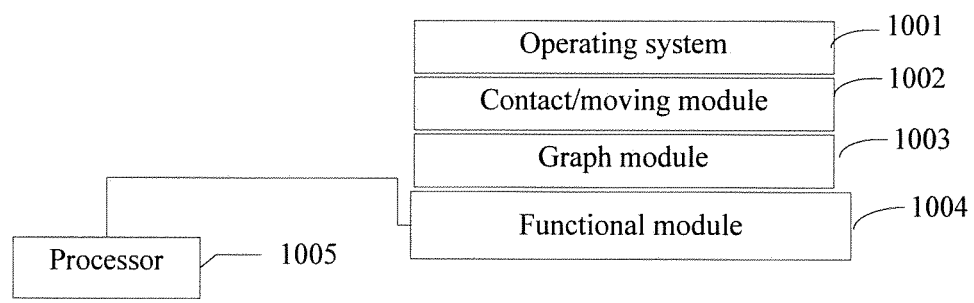
FIG. 10 is a schematic structural diagram of another embodiment of an intelligent terminal according to embodiments of the present invention.

FIG. 10 is a diagram of a part of an internal structure of an intelligent terminal. In this embodiment of the present invention, a software component stored in the memory 901 may include an operating system 1001, a contact/moving module 1002, a graph module 1003, and a functional module 1004.

The operating system 1001 (for example, Darwin, RTXC, LINUX, UNIX, OS X, WINDOWS, or an embedded operating system such as VxWorks includes various software components and/or drivers for controlling and managing general system tasks (such as memory management, storage device control, and power management), and facilitates communication between various hardware and software components.

The contact/moving module 1002 may check contact with the screen 903. The contact/moving module 1002 includes various software components for executing and detecting various contact-related operations.

The graph module 1003 includes various known software components for displaying a graph on the screen 903, including a component for changing intensity of a displayed graph. For example, the graph module 1003 receives an instruction of a central processing unit 1005, and displays, on the screen 903, a prompt window, graphical user interfaces of various software, or the like.

The functional module 1004 is configured to be executed by the central processing unit 1005, where the central processing unit 1005 is configured to:

check, at a service layer, whether load of an intelligent terminal system exceeds a preconfigured maximum threshold;

if it is detected that the load of the intelligent terminal system does not exceed the maximum threshold, trigger, at the service layer, execution of determining whether hardware runs abnormally;

determine whether the hardware runs abnormally;

determine target hardware that runs abnormally; and acquire exception information of the target hardware, and notify a user that the target hardware runs abnormally.

In some embodiments of the present invention, the central processing unit 1005 is further configured to:

acquire a use frequency of the hardware;

create a check list according to the use frequency of the hardware, where the hardware in the check list is sorted in descending order by use frequency;

send test data to the hardware in the check list one by one in sequence according to a preconfigured check frequency;

receive response data returned by the hardware according to the test data;

determine whether the response data is equal to a preconfigured expected value;

if the response data is equal to the preconfigured expected value, determine that the hardware runs normally;

if the response data is not equal to the preconfigured expected value, determine that the hardware runs abnormally; and determine the hardware that runs abnormally as the target hardware.

It should be noted that persons of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory, a random access memory, or the like.

The foregoing describes in detail the method for checking whether hardware of an intelligent terminal runs abnormally and the intelligent terminal according to the present invention. Specific embodiments are used in this specification to describe the principle and implementation manners of the present invention. Descriptions of the foregoing embodiments are merely intended to help understand the method and core idea of the present invention. In addition, with respect to the implementation manners and the application scope, modifications may be made by persons of ordinary skill in the art according to the idea of the present invention. Therefore, the specification shall not be construed as a limitation on the present invention. The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

It can be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners.

For example, the described apparatus embodiment is merely exemplary. For example, the unit division is merely logical function division or may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a portable hard disk, a read-only memory, a random access memory, a magnetic disk, or an optical disc.

The foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for checking whether hardware of an intelligent terminal runs abnormally, the method comprising:
    checking, by an intelligent terminal at a service layer, whether load of an intelligent terminal system exceeds a preconfigured maximum threshold;
    if the intelligent terminal detects that the load of the intelligent terminal system does not exceed the maximum threshold, triggering, by the intelligent terminal at the service layer, execution of determining whether hardware runs abnormally;
    determining, by the intelligent terminal, whether the hardware runs abnormally;
    determining, by the intelligent terminal, target hardware that runs abnormally; and
    acquiring, by the intelligent terminal, exception information of the target hardware, and notifying a user that the target hardware runs abnormally.

2. The method according to claim 1, wherein:
    determining, by the intelligent terminal, whether the hardware runs abnormally further comprises:
        acquiring, by the intelligent terminal, a use frequency of the hardware;
        creating, by the intelligent terminal, a check list according to the use frequency of the hardware, wherein the hardware in the check list is sorted in descending order by use frequency;
        sending, by the intelligent terminal, test data to the hardware in the check list one by one in sequence according to a preconfigured check frequency;
        receiving, by the intelligent terminal, response data returned by the hardware according to the test data;
        determining, by the intelligent terminal, whether the response data is equal to a preconfigured expected value;
        if the intelligent terminal determines that the response data is equal to the preconfigured expected value, determining that the hardware runs normally;
        if the intelligent terminal determines that the response data is not equal to the preconfigured expected value, determining that the hardware runs abnormally; and
    determining, by the intelligent terminal, target hardware that runs abnormally further comprises:
        determining, by the intelligent terminal, the hardware that runs abnormally as the target hardware.

3. The method according to claim 1, wherein acquiring, by the intelligent terminal, exception information of the target hardware, and notifying a user that the target hardware runs abnormally further comprises:
    acquiring, by the intelligent terminal, exception information that comprises an identifier of the target hardware and a cause of abnormal running of the target hardware; and
    generating, by the intelligent terminal, a prompt window for displaying the exception information.

4. The method according to claim 1, wherein acquiring, by the intelligent terminal, exception information of the target hardware, and notifying a user that the target hardware runs abnormally further comprises:
    acquiring, by the intelligent terminal, exception information that comprises an identifier of the target hardware, a cause of abnormal running of the target hardware, and an identifier of an application program that invokes the target hardware; and
    generating, by the intelligent terminal, a prompt window for displaying the exception information.

5. An intelligent terminal for checking whether hardware runs abnormally, the intelligent terminal comprising:
    a memory; and a processor in communication with the memory, wherein the processor is configured to:
    check, at a service layer, whether load of an intelligent terminal system exceeds a preconfigured maximum threshold;
    if the load of the intelligent terminal system does not exceed the maximum threshold, trigger, at the service layer, execution of determining whether hardware runs abnormally;
    determine whether the hardware runs abnormally;
    determine target hardware that runs abnormally; and
    acquire exception information of the target hardware, and notify a user that the target hardware runs abnormally.

6. The intelligent terminal according to claim 5, wherein the processor is further configured to:
    acquire a use frequency of the hardware;
    create a check list according to the use frequency of the hardware, wherein the hardware in the check list is sorted in descending order by use frequency;
    send test data to the hardware in the check list one by one in sequence according to a preconfigured check frequency;
    receive response data returned by the hardware according to the test data;
    determine whether the response data is equal to a preconfigured expected value;
    if the response data is equal to the preconfigured expected value, determine that the hardware runs normally; and
    if the response data is not equal to the preconfigured expected value, determine that the hardware runs abnormally; and
    determine the hardware as the target hardware.

7. The intelligent terminal according to claim 5, wherein the processor is further configured to:
    acquire exception information that comprises an identifier of the target hardware and a cause of abnormal running of the target hardware; and
    generate a prompt window, wherein the prompt window is used for displaying the exception information.

8. The intelligent terminal according to claim 5, wherein the processor is further configured to:
    acquire exception information that comprises an identifier of the target hardware, a cause of abnormal running of the target hardware, and an identifier of an application program that invokes the target hardware; and
    generate a prompt window, wherein the prompt window is used for displaying the exception information.

9. An intelligent terminal, comprising:
a screen;
a memory; and
one or more central processing units configured to:
    check, at a service layer, whether load of an intelligent terminal system exceeds a preconfigured maximum threshold;
    if it is detected that the load of the intelligent terminal system does not exceed the maximum threshold, trigger, at the service layer, execution of determining whether hardware runs abnormally;
    determine whether the hardware runs abnormally;
    determine target hardware that runs abnormally; and
    acquire exception information of the target hardware, and notifying a user that the target hardware runs abnormally.

10. The intelligent terminal according to claim 9, wherein the one or more central processing units is configured to:
    acquire a use frequency of the hardware;
    create a check list according to the use frequency of the hardware, wherein the hardware in the check list is sorted in descending order by use frequency;
    send test data to the hardware in the check list one by one in sequence according to a preconfigured check frequency;
    receive response data returned by the hardware according to the test data;
    determine whether the response data is equal to a preconfigured expected value;
    if the response data is equal to the preconfigured expected value, determine that the hardware runs normally;
    if the response data is not equal to the preconfigured expected value, determine that the hardware runs abnormally; and
    determine the hardware that runs abnormally as the target hardware.

* * * * *